United States Patent
Moon

(10) Patent No.: US 6,798,150 B2
(45) Date of Patent: Sep. 28, 2004

(54) BACK LIGHT UNIT

(75) Inventor: Jeong Min Moon, Gunpo-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/422,811

(22) Filed: Apr. 25, 2003

(65) Prior Publication Data

US 2004/0119418 A1 Jun. 24, 2004

(30) Foreign Application Priority Data

Dec. 18, 2002 (KR) .................... 10-2002-81321

(51) Int. Cl.$^7$ ............................. G09G 3/10; G09F 13/04
(52) U.S. Cl. ...................... 315/169.3; 362/227; 362/97
(58) Field of Search ........................ 315/169.3, 205, 315/250, 324, 35, DIG. 1, 160, 161; 362/84, 29, 97, 224, 227, 240; G09G 3/10; G09F 13/04

(56) References Cited

U.S. PATENT DOCUMENTS

| | | | |
|---|---|---|---|
| 5,325,024 A | 6/1994 | Piejak et al. ................ | 315/248 |
| 5,760,541 A | 6/1998 | Stavely et al. ............... | 313/491 |
| 5,889,366 A | 3/1999 | Yokokawa et al. ......... | 313/607 |
| 2002/0027774 A1 * | 3/2002 | Nishiyama et al. ........... | 362/29 |
| 2003/0015943 A1 * | 1/2003 | Kim et al. .................. | 310/359 |
| 2003/0035283 A1 * | 2/2003 | Lim ............................ | 362/97 |

FOREIGN PATENT DOCUMENTS

| | | | | |
|---|---|---|---|---|
| GB | 2 207 496 A | 2/1989 | | |
| GB | 2 378 802 A | 2/2003 | | |
| JP | 2000-338487 A | * 12/2000 | ............ | G02B/6/10 |
| WO | WO 01/79922 A1 | 10/2001 | | |

* cited by examiner

Primary Examiner—Don Wong
Assistant Examiner—Trinh Vo Dinh
(74) Attorney, Agent, or Firm—Morgan, Lewis & Bockius LLP

(57) ABSTRACT

A back light unit provides light to a light emission surface of a liquid crystal display device. The back light includes a plurality of lamps, a plurality of inverters, a plurality of first power lines, and a plurality of second power lines. Each lamp has first and second ends and is disposed substantially only in one of an integer (n) number regions of the light emission surface wherein the regions divide a length of the light emission surface into n regions. Each one of the first power lines are respectively connected to the first ends of the lamps and first connectors of the inverters, and each one of the second power lines are respectively connected to the second ends of the lamps and second connectors of the inverters.

28 Claims, 8 Drawing Sheets

Boundary Region   Boundary Region

BACK LIGHT UNIT

The present application claims the benefit of the Korean Application No. P2002.81321 filed in Korea on Dec. 18, 2002, which is hereby incorporated by reference.

BACKGROUND OF THE INVENTION

1. Field of the Invention

The present invention relates to a back light unit for a liquid crystal display device, and more particularly, to power lines connected between lamps and an inverter in a back light unit for a liquid crystal display device.

2. Discussion of the Related Art

The CRT (Cathode Ray Tube) display technology, which is employed in a wide variety of applications—such as TV receivers, instruments, computer monitors, and information terminals—cannot meet the requirements of reduced size and weight needed for electronic goods due to weight and size of the CRT itself. Thus, the CRT display has certain limitations in the trend of reducing size and weight of electronic goods in view of weight and size of the CRT.

Of the types of displays that are expected to replace CRTs, liquid crystal displays (LCD) using an electro-optical effect, plasma display panels (PDP) using gaseous discharge, EL displays (Electro Luminescence Display) using an electro luminescence effect, and the like, have been researched. Among these, the LCD display has been the most actively researched. As such, in order to replace CRTs, development of the LCDs has been successful in reducing size, weight, and power consumption of the displays. Accordingly, LCDs are becoming increasingly used as flat displays for not only monitors in laptop computers, but also monitors in desktop computers and large sized information displays.

Since most LCDs are light receptive devices in which control of a light provided from outside the device is required for displaying a picture, a separate light source for providing the light to an LCD panel (i.e., a back light unit) is required. In general, the back light unit used as the light source of the LCD is a cylindrical lamp arranged in an edge light type or a direct type.

In the edge light type, a lamp unit is place at a side of a light plate that guides the light, wherein the lamp unit is provided with a lamp for emission of the light, lamp holders inserted in both sides of the lamp for protection of the lamp, and a lamp reflecting plate inserted in a side surface of the light plate to surround an outside surface of the lamp for reflecting the light from the lamp toward the light plate. The edge light type, with the lamp unit provided to the side surface of the light plate, is employed in comparatively small sized LCDs—such as laptop computers and desk top computers—having good uniformity of light, long lifetime, and easy fabrication with thin dimensions.

On the other hand, the direct type is more commonly used as size of the LCD becomes larger greater than 20 inches with a priority given thereto. The direct type is provided with a plurality of lamps arranged on a line under a diffuse plate for directing the light to a front surface of the LCD panel, directly. Because the direct type has a light utilization efficiency higher than that of the edge light type, the direct type is employed in large sized LCDs.

A related art back light unit will be described with reference to the attached drawings. FIG. 1 illustrates a perspective view of a related art direct type back light unit, FIG. 2 illustrates a plan view of a first related art lamp arrangement, FIG. 3 illustrates a back view of a back light unit having inverters for applying electrical signal to the lamps in the arrangement of FIG. 2, and FIG. 4 illustrates a plan view of a second related art lamp arrangement.

Referring to FIGS. 1 and 2, the related art back light unit is provided with a plurality of lamps 1, an outside case 3 for holding and supporting the lamps 1, and light scattering means 5a, 5b, and 5c between the lamps 1 and an LCD panel (not shown). The light scattering means 5a, 5b, and 5c is provided with a plurality of diffusion sheets and diffusion plates between the lamps 1 and the LCD panel for enhancing a light scattering effect to prevent the lamps from being shown on a screen of the LCD and providing a uniform luminance distribution. There is a reflection plate 7 on an inside surface of the outside case 3 for directing the light from the lamps 1 only to the display part of the LCD panel.

The lamp 1 is a cold cathode fluorescent lamp (CCFL) provided with electrode parts 2a and 2b at opposite ends of an inside of a tube, each connected to a power line 9a or 9b. Opposite ends of the lamp 1 are inserted in holes formed in opposite surfaces of the outside case 3. When a voltage is provided to the electrode parts 2a and 2b through the power lines 9a and 9b, the lamp 1 emits the light. The voltage provided to the power lines is supplied from an inverter 30 provided in one side part of back of the outside case 3, as shown in FIG. 3. In the power lines 9a and 9b, there are a high voltage power line 31 and a low voltage power line 32 depending on voltages provided thereto. That is, the high voltage power line 31 and the low voltage power line 32 from opposite ends of the lamp 1 are connected to one/the other terminals of the inverter 30 connector for receiving voltages.

To minimize electrical influences on the LCD panel and external devices, a length of the high voltage power line 31 is shorter than a length of the low voltage power line 32. In the related art direct type back light unit, a length of the lamp 1 is substantially equal to a length of a front light emission surface of the back light unit. Therefore, the larger the size of the light emission surface, the longer the length of the lamp 1. For an example, currently an LCD with a size over 30–40 inches requires a length of the lamp longer than 700 mm.

Thus, the longer the length of the lamp not only is fabrication of the lamp more difficult, but also assembly of the lamp with the back light unit is more difficult and susceptible to an external impact damage. Moreover, a luminance of the lamp becomes non-uniform. Thus, picture quality deterioration (EMI: Electro Magnetic Interference) occurs due to instability and electronic influence from the driving circuit of the LCD because high turn-on and sustaining voltages are required.

Due to such a problem, in some direct type back light units, as shown in FIG. 4, the lamps 40 are arranged in a height direction of the light emission surface. In this instance, the electrode parts 42a and 42b are provided at opposite ends of an inside of each tube of the lamp 40, and the power lines 43a and 43b are connected to the electrode parts 42a and 42b, respectively. A reflection plate 41 is provided behind the lamps 40.

However, the arrangement of the lamps 40 in the height direction of the light emission surface causes mercury inside of the tubes of the lamp 40 to gather to a bottom thereof due to gravity. As a result, performance of the lamp 40 is deteriorated if the back light unit is used for a long time.

SUMMARY OF THE INVENTION

Accordingly, the present invention is directed to a back light unit that substantially obviates one or more of the problems due to limitations and disadvantages of the related art.

An object of the present invention is to provide a back light unit which can improve an efficiency of a lamp, and permits an effective wiring arrangement for the lamps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a back light unit having a light emission surface comprises a plurality of lamps each having first and second ends, each lamp disposed substantially only in one of an integer (n) number regions of the light emission surface, wherein the regions divide a length of the light emission surface into n regions; a case for holding the lamps; a reflection plate disposed on an inside surface of the case; a plurality of inverters on a back side of the case; a plurality of power line vias formed through portions of the case and the reflection plate at portions adjacent to the second ends of the lamps, the lamps being disposed on an inside of the outside case; a plurality of first power lines respectively connected between the first ends of the lamps and first connectors of the inverters; and a plurality of second power lines connected between the second ends of the lamps and second connectors of the inverters, the second power lines passing through the power line vias.

In another aspect, a back light unit having a light emission surface comprises a plurality of lamps such that a first set of the lamps are disposed in a left portion of the light emission surface and a second set of the lamps are disposed in a right portion of the light emission surface, the left and right portions to divide a length of the emission surface; a case for holding the lamps on an inside thereof; a reflection plate disposed on an inside surface of the case; a plurality of inverters such that first and second sets of the inverters are on opposing edges of a back surface of the case; a plurality of power line vias formed through the case and the reflection plate at portions adjacent to ends of the lamps in a central portion of the case; a plurality of high voltage power lines respectively connected between ones of the inverters and ends of the lamps disposed on a side of the case opposite to the inverters; and a plurality of low voltage power lines respectively connected between ones of the inverters and ends of the lamps proximate to the power line vias through the power line vias.

In another aspect, a back light unit having a light emission surface comprises a plurality of lamps such that a first set of the lamps are disposed in a left portion of the light emission surface and a second set of the lamps are disposed in a right portion of the light emission surface, the left and right portions substantially equally divide a length of the emission surface; a case for holding the lamps on an inside thereof; a reflection plate disposed on an inside surface of the case; a plurality of inverters such that first and second sets of the inverters are disposed at a central portion of the case on a back side of the case; a plurality of power line vias formed through the case and the reflection plate at portions adjacent to ends of the lamps in the central portion of the case; a plurality of high voltage power lines respectively connected between the inverters and ends of the lamps disposed on a side of the case opposite to the inverters through the power line vias; and at least one low voltage power line respectively connected between at least one inverter and the other ends of the lamps.

In another aspect, a back light unit for providing light to a light emission surface comprises a plurality of lamps each having first and second ends, each lamp disposed substantially only in one of an integer (n) number regions of the light emission surface, wherein the regions divide a length of the light emission surface into n regions; a power supply system; a plurality of first power lines respectively connected to the first ends of the lamps and first connectors of the inverters; and a plurality of second power lines respectively connected to the second ends of the lamps and second connectors of the inverters.

In another aspect, a back light unit for providing light to a light emission surface comprises a plurality of lamps each having first and second ends, the lamps being disposed so that sets of the lamps span a substantially entire length of the light emission surface, each set having more than one lamp; a power supply system; a plurality of first power lines respectively connected to the first ends of the lamps and first connectors of the power supply system; and a plurality of second power lines respectively connected to the second ends of the lamps and second connectors of the power supply system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides a wiring arrangement for electrical connection of power lines to opposite ends of a lamp from an output portion (hereafter called as connector) of an inverter where a plurality of the lamps each have a length shorter than a length of a light emission surface of the back light unit are alternately arranged. For connecting the power lines to opposite ends of the lamp from the connectors of the inverter, holes (vias) are made in a reflection plate and an outside case. There are a high voltage line and a low voltage line in the power line to opposite ends of the lamp.

Figure 1:
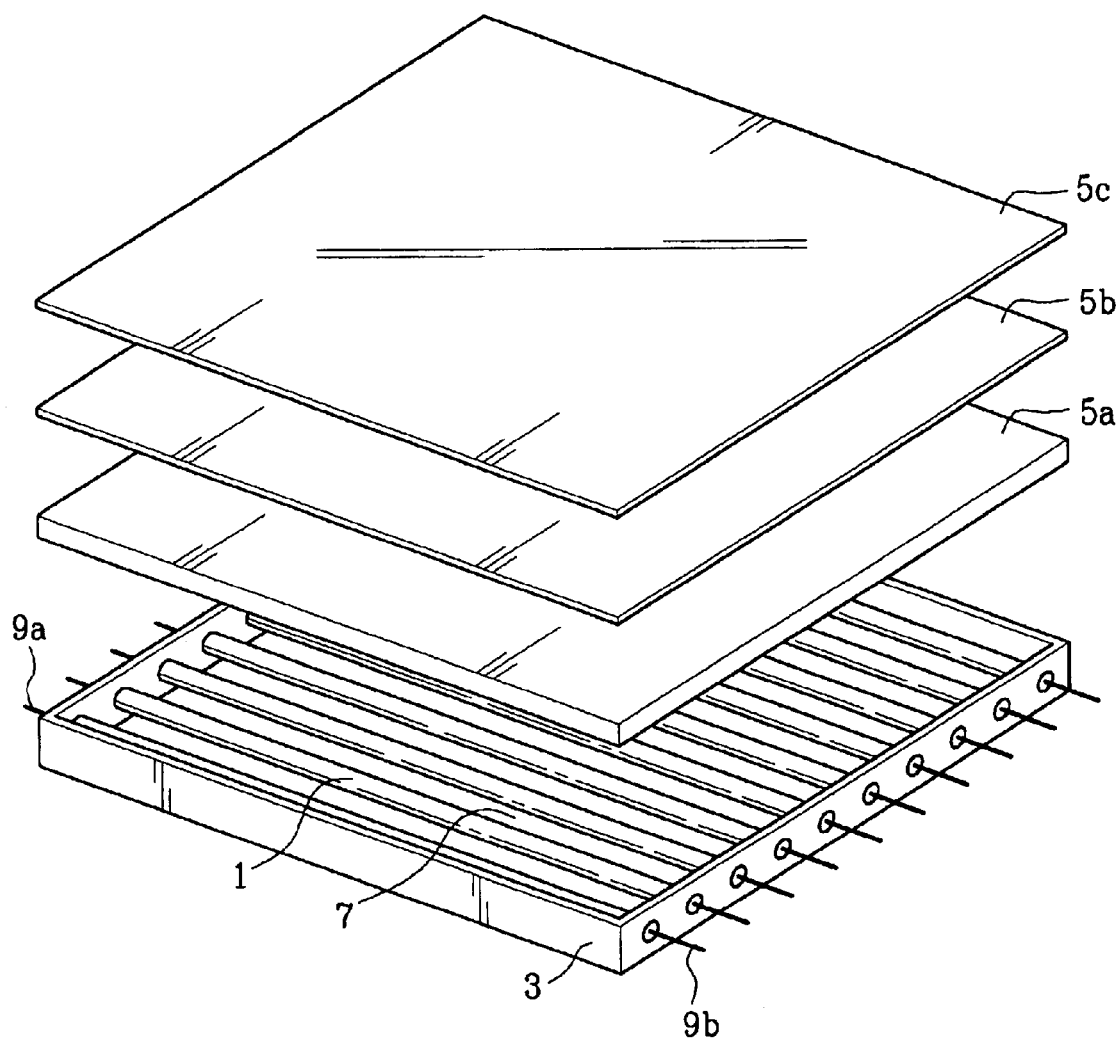
FIG. 1 illustrates a perspective view of a related art direct type back light unit.
Figure 2:
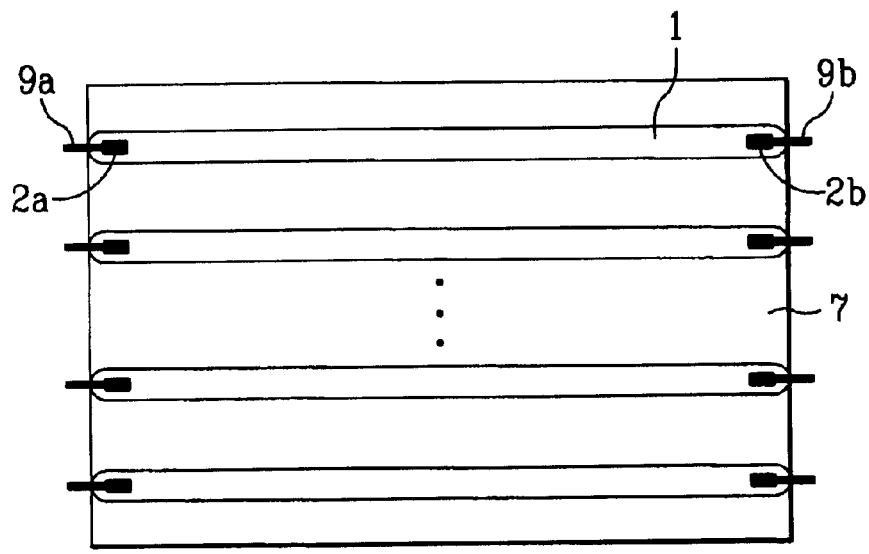
FIG. 2 illustrates a plan view of a first exemplary related art lamp arrangement.
Figure 3:
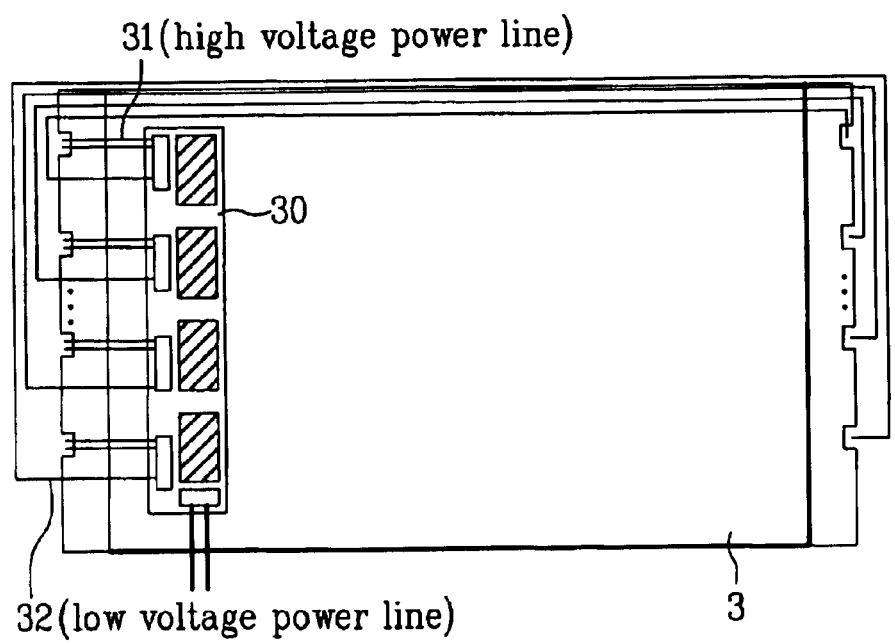
FIG. 3 illustrates a back view of a back light unit having inverters for applying signal to the lamps in FIG. 2.
Figure 4:
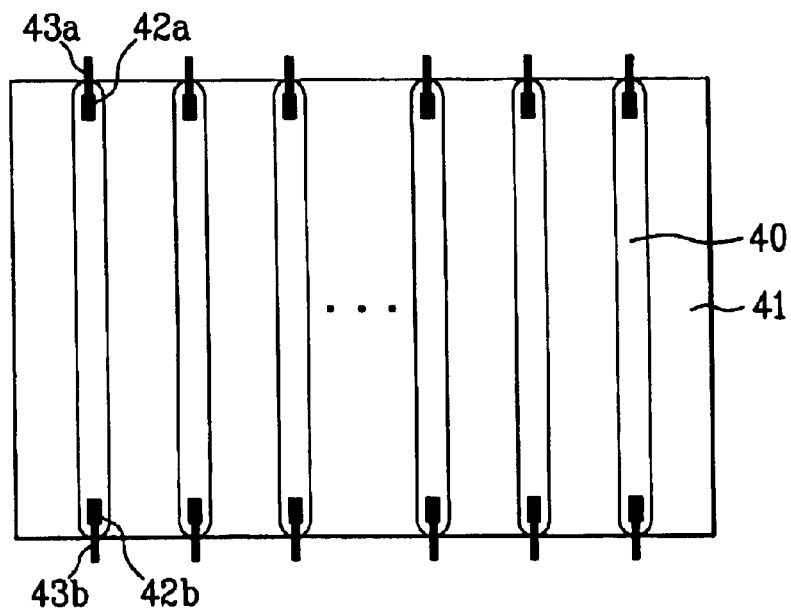
FIG. 4 illustrates a plan view of a second exemplary related art lamp arrangement.
Figure 5:
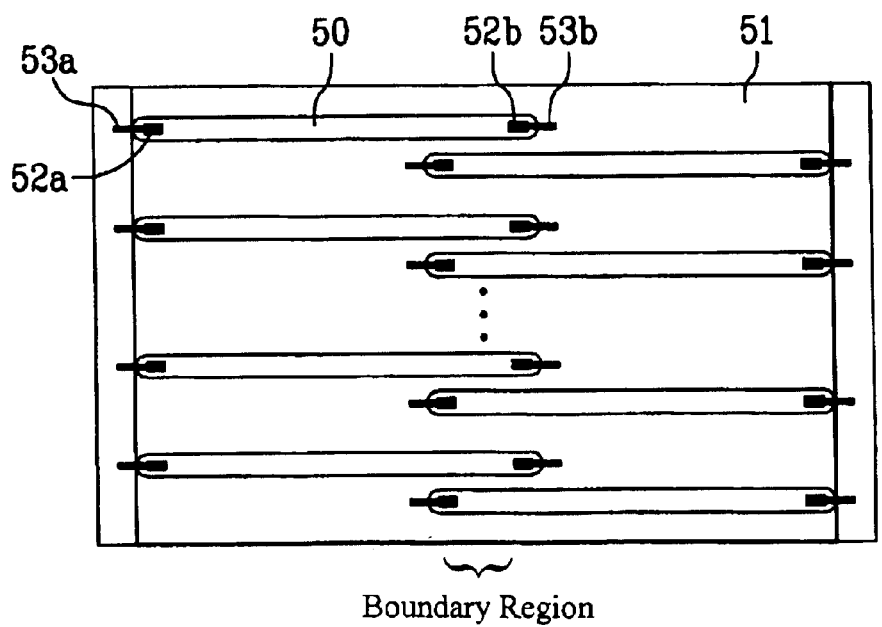
FIG. 5 illustrates a plan view of a first exemplary lamp arrangement for applying the invention thereto.
Figure 6:
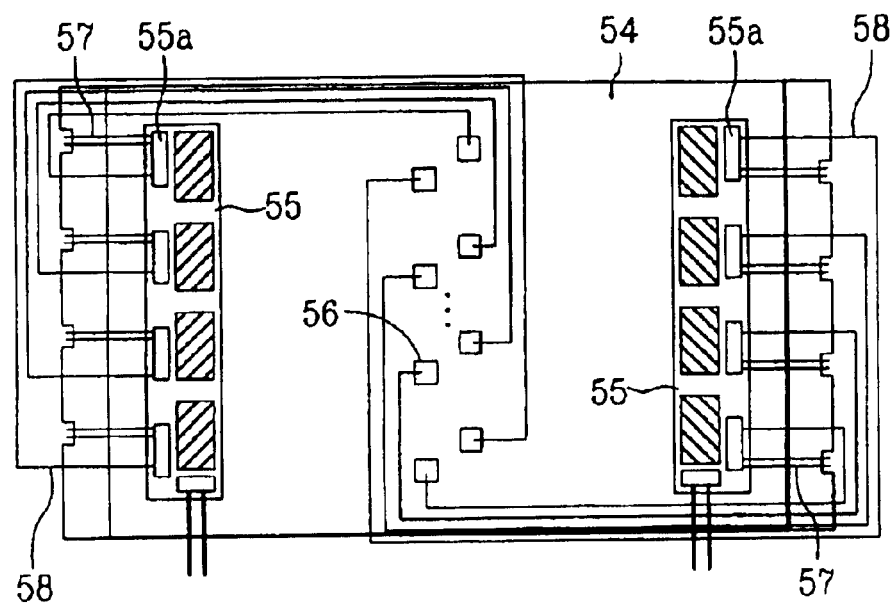
FIG. 6 illustrates a back view of a back light unit in accordance with a first exemplary embodiment of the present invention applied to FIG. 5.

FIG. 5 illustrates a plan view of a first exemplary lamp arrangement for applying the present invention thereto, and FIG. 6 illustrates a back view of a back light unit in accordance with a first exemplary embodiment of the present invention applied to FIG. 5.

Referring to FIGS. 5 and 6, the back light unit includes a plurality of lamps 50 alternately arranged in a right part and a left part of an entire light emission surface dividing a length of the light emission surface into two. The back light unit also includes an outside case (not shown) for holding the lamps 50, a reflection plate 51 provided to an inside surface of the outside case for directing a light from the lamp 50 to a display part of the LCD panel, and light scattering means (not shown) between the lamps 50 and the LCD panel (not shown). Since a longer display screen of the LCD panel requires a longer light emission surface of the back light unit, a longer lamp 50 is required. The longer lamp 50 in turn requires a higher tube voltage applied to the lamp 50. For improving this, lamps 50 each with a length shorter than the length of the light emission surface of the lamps 50 (approximately ½) are arranged in a left part and a right part alternately with reference to a center line as respective left and right sets of lamps (hereinafter, left and right lamps). As shown in FIG. 5, the electrode parts 52a and 52b may be arranged in a staggered arrangement to define zigzag form in a central portion, thereby dividing the emission surface into substantially equal portions. The arrangement permits to use lamps 50 that requires a lower sustaining voltage (a tube voltage) and to improve non-uniform distribution of luminance of entire screen. Though not shown, in an alternative arrangement (not shown), the right/left lamps 50 may be aligned so that the electrode parts 52a and 52b are aligned side by side.

Of course, the right and left lamps 50 may have a slight overlap to ensure illumination of the full light emission surface without dark areas. However, the overlap of the lamps 50 should not be too large so that there are no bright areas. Similarly, if an non-overlap (i.e., gap) between lamps 50 is present, it should not be so large that there are dark areas. Accordingly, the overlap (or non-overlap) should be less than about 20 mm, and more preferably, about 2–10 mm. Here, the overlap can be approximately the size of the electrode parts 52a (or 52b) of the lamps 50 which may be about 2 mm.

The lamps 50 are CCFL, each with electrode parts 52a and 52b at opposite ends of an inside of each tube to which the power lines 53a and 53b are connected. When voltages are provided to the electrode parts 52a and 52b through the power lines 53a and 53b, the lamps 50 emit light.

As shown in FIG. 6, the voltages to the power lines are supplied from an inverter 55 arranged in opposite sides of a back surface of the outside case 54. There are a plurality of power line holes 56 in a central portion of the reflection plate 51 and the outside case 54 at a portion opposing the ends of the lamps 50. The ones of the power lines 53a and 53b arranged at an opposite side from the inverter 55 are used as high voltage power lines 57. The high voltage lines 57 are respectively connected to the connectors 55a of the inverter 55. The ones of the power lines 53a and 53b in a center portion of the outside case 54 pass through the power line holes 56 and are used as low voltage power lines 58. The low voltage power lines 58 are connected to the other ends of the connectors 55a of the inverter 55.

In connecting the high voltage power lines 57 and the low voltage power lines 58 to one/the other terminals of the connector such that an electrical influence to the LCD panel is minimized, lengths of the high voltage power lines 57 are provided to be equal to, or shorter than lengths of the low voltage power lines 58. When the inverter 55 is provided on opposite side parts of back of the outside case 54, the power lines 53a and 53b of the lamps 50 positioned at opposite edge sides are used as high voltage power lines 57, and the power lines 53a and 53b of the lamps in the central portion are used as the low voltage power lines 58.

Though not shown, opposite ends of the lamps 50 are passed through holes (not shown) in opposite surfaces of the outside case 54. The light scattering portion, provided to prevent the lamps from being shown on a screen of the LCD panel and to provide a uniform luminance distribution, is provided with a plurality of diffusion sheets, diffusion plates, and the like between the lamp and the LCD panel, thereby enhancing a light scattering effect.

Thus, by arranging lamps each with a length shorter than a length of the light emission surface in left/right parts alternately, providing power line holes in a central part of the reflection plate 51 and the outside case 54, and arranging lengths of the high voltage power lines shorter than lengths of the low voltage power lines, a tube voltage of the lamps can be reduced and an overall luminance balance can be achieved.

Figure 7:
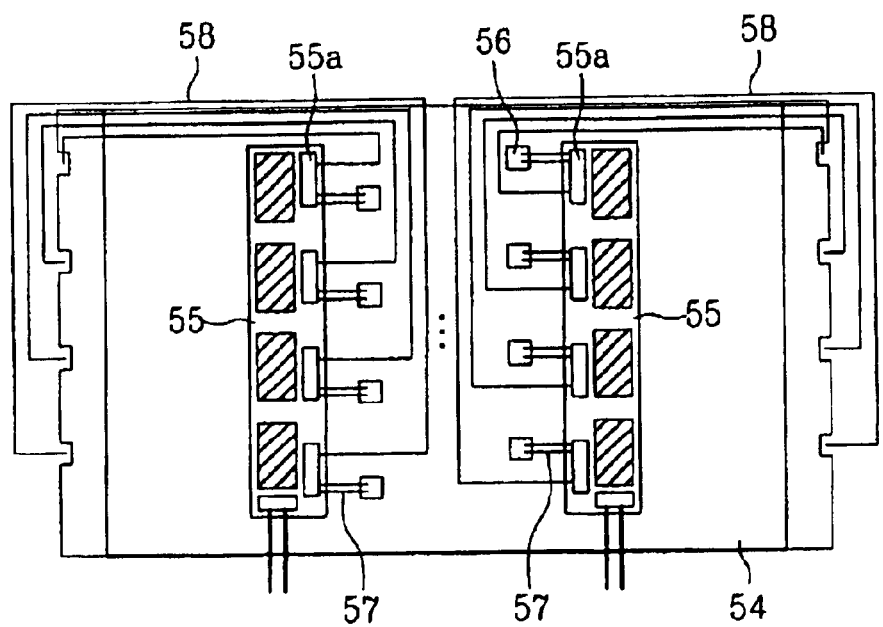
FIG. 7 illustrates a back view of a back light unit in accordance with a second exemplary embodiment of the present invention applied to FIG. 5.

A second exemplary embodiment for a back light unit according to the present invention will be described with reference to FIGS. 5 and 7. FIG. 5 illustrates a plan view of a first exemplary lamp arrangement for applying the present invention thereto, and FIG. 7 illustrates a back view of a back light unit in accordance with a second exemplary embodiment of the present invention applied to the arrangement of FIG. 5. Referring to FIGS. 5 and 7, the back light unit has the same system with the first exemplary embodiment back light unit except a position of the inverter 55 and an arrangement of the high voltage power lines 57 and the low voltage power lines 58 according to the position of the inverter 55. A system of the second exemplary embodiment will be described with reference to the differences from the first exemplary embodiment.

Referring to FIGS. 5 and 7, two inverters 55 are arranged in a central portion of back surface of the outside case 54 in parallel. There are a plurality of power line holes 56 in a central portion of the reflection plate 51 and the outside case 54 at portions facing opposite to ends of the lamp 50. The power lines 53a and 53b are extended from opposite ends of the lamp 50. The ones of the power lines 53a and 53b at opposite edges of the outside case 54 are used as low voltage power lines 58. Each of the low voltage power lines 58 are connected to one of the terminals of the connectors 55a of the inverter 55. The ones of the power lines 53a and 53b from ends of the lamps 50 arranged in the central portion opposite to the inverter 55 in FIG. 5 pass through the power line holes 56 and act as high voltage power lines 57. The high voltage power lines 57 are connected to the other terminals of the connectors 55a. In connecting the high voltage power lines 57 and the low voltage power lines 58 to respective terminals, lengths of the high voltage power lines 57 are provided to be equal to, or shorter than lengths of the low voltage power lines 58, thereby minimizing electronic influence on the LCD panel.

Because the inverter 55 is provided on a back surface adjacent to the central portion of the outside case 54, the power lines 53a and 53b of the lamps 50 connected to ends of the lamps 50 positioned opposite edges are used as low voltage power lines 57, and the power lines 53a and 53b connected to ends of the lamps 50 positioned in the central part are used as the high voltage power lines 58. Thus, by alternately arranging lamps in left/right portions each with a length shorter than a length of the light emission surface, providing power line holes in a central portion of the reflection plate 51 and the outside case 54, and arranging lengths of the high voltage power lines to be shorter than lengths of the low voltage power lines, a tube voltage of the lamps can be reduced and overall luminance balance can be improved.

Figure 8:
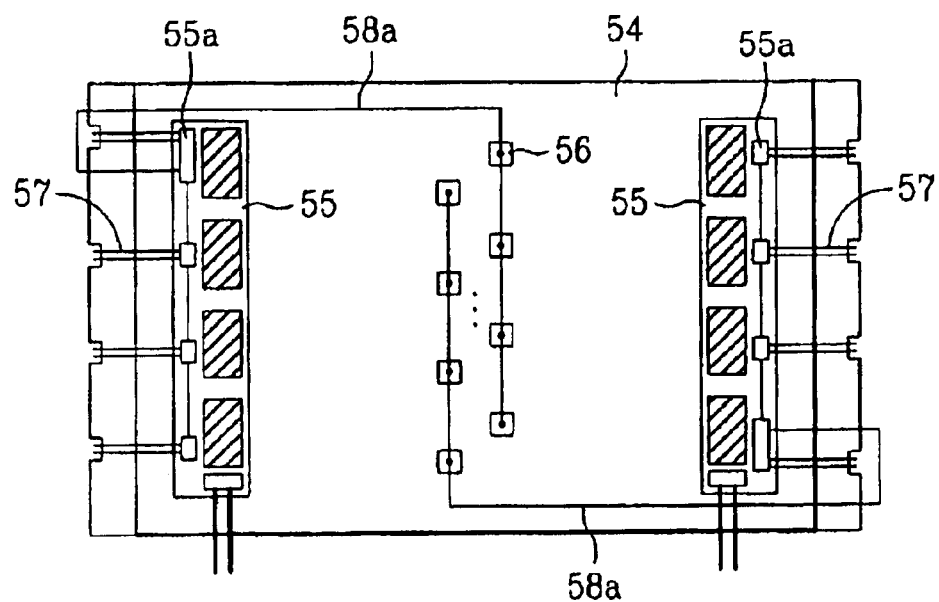
FIG. 8 illustrates a back view of a back light unit in accordance with a third exemplary embodiment of the present invention applied to FIG. 5.

A third exemplary embodiment for a back light unit of the present invention will be described with reference to FIGS. 5 and 8. FIG. 5 illustrates a plan view of a first exemplary lamp arrangement for applying the present invention thereto, and FIG. 8 illustrates a back view of a back light unit in accordance with a third exemplary embodiment of the present invention applied to the arrangement of FIG. 5. Referring to FIGS. 5 and 8, the back light unit has the same system with the first exemplary embodiment back light unit except the low voltage power lines 58 are combined into one line. A system of the third exemplary embodiment back light unit will now be described.

Referring to FIGS. 5 and 8, the inverters 55 are arranged on opposite edges of a back surface of the outside case 54. There are a plurality of power line holes 56 in a central portion of the reflection plate 51 and the outside case 54 facing opposite to ends of the lamps 50. The power lines 53a and 53b are extended from opposite ends of the lamp 50. The ones of the power lines 53a and 53b at opposite edges of the outside case 54 (power lines 53a and 53b arranged in parts opposite to the inverters 55) are used as high voltage power lines 57. The high voltage power lines 57 are connected to terminals of the connectors 55a of the inverters 55. The ones of the power lines 53a and 53b positioned in the central portion of the outside case 54 are low voltage power lines that pass through the power line holes 56 and are connected to a common low voltage power line 58a. That is, the low voltage power line 58a, being a single line, is connected to the other terminals of the plurality of connectors 55a of the inverter 55.

Though not shown, the low voltage common power line 58a may be connected as one single line by arranging two PCB substrates in a height direction along which the power line holes 56 are formed, and soldering the power lines 53a and 53b passed through the PCB substrates to electrode lead lines formed on one line on the PCB substrates. The electrode lead lines are connected to the low voltage common power line 58a connected to the connector of the inverter 55. Instead of the PCB substrates, electric wires may be used for connecting the power lines 53a and 53b to the low voltage common power line 58a.

In connecting the high voltage power lines 57 and the low voltage common power line 58a to the terminals of the inverter connector, a length of each of the high voltage power lines 57 is provided to be equal to, or shorter than a length of the low voltage common power line 58a, thereby minimizing an electrical influence on the LCD panel. Because the inverters 55 are provided on opposite edges of a back surface of the outside case 54, the power lines 53a and 53b of the lamps 50 positioned at opposite edges are used as high voltage power lines 57, and the power lines 53a and 53b of the lamps 50 positioned in the central portion are connected to the low voltage common power line 58a.

Figure 9:
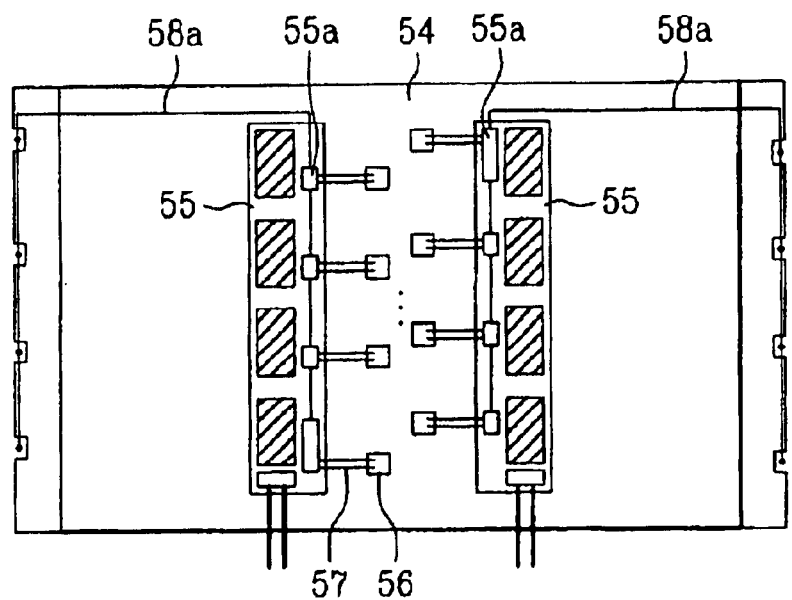
FIG. 9 illustrates aback view of a back light unit in accordance with a fourth exemplary embodiment of the present invention applied to FIG. 5.

A fourth exemplary embodiment for a back light unit of the present invention will be described with reference to FIGS. 5 and 9. FIG. 5 illustrates a plan view of a first exemplary lamp arrangement for applying the present invention thereto, and FIG. 9 illustrates a back view of a back light unit in accordance with a fourth exemplary embodiment of the present invention applied to the arrangement of FIG. 5. Referring to FIGS. 5 and 9, the back light unit has the same system with the second exemplary embodiment back light unit except the low voltage power lines 58 are combined into one line. A system of the third exemplary embodiment back light unit will now be described.

Referring to FIGS. 5 and 9, the inverters 55 are arranged in the central portion of a back surface of the outside case 54. There are a plurality of power line holes 56 in a central portion of the reflection plate 51 and the outside case 54 at portions facing opposite to ends of the lamps 50 positioned in the central portion. The ones of the power lines 53a and 53b positioned at opposite edges of the outside case 54 are connected to one low voltage common power line 58a. The low voltage common power line 58a is connected to one terminal of one connector among a plurality of connectors 55a, and the connectors 55a of the inverters 55 are connected to each other extended from the low voltage common power line 58a. The ones of the power lines 53a and 53b in the central portion of the outside case 54 (power lines 53a and 53b arranged in portions opposite to the inverters 55) are passed through the power line holes 56 and used as a plurality of high voltage power lines 57. The high voltage power lines 57 are connected to the other terminals of the connectors 55a of the inverters 55.

In connecting the high voltage power lines 57 and the low voltage common power line 58a to the terminals of the inverter connector, a length of each of the high voltage power lines 57 is provided to be equal to or shorter than a length of the low voltage common power line 58a, thereby minimizing an electronic influence on the LCD panel. As the inverters 55 are provided to a back surface of the outside case 54 adjacent to the central part thereof, the power lines 53a and 53b of the lamps 50 positioned at opposite edges arc connected to the low voltage common power line 58a as a low voltage power line, and the power lines 53a and 53b of the lamps 50 positioned in the central portion arc used as the high voltage power line 57.

Though not shown in the drawing, the low voltage common power line may be connected into one line by arranging two PCB substrates in a height direction along which the power line holes are formed and soldering the power lines 53a and 53b passed through the PCB substrates to electrode lead lines formed on the PCBs in one line direction. The electrode lead lines are connected to the low voltage common power lines 58a connected to the connector of the inverters 55. Instead of the PCB substrates, electric wires may be used for connecting the power lines 53a and 53b to the low voltage common power line 58a.

Figure 10:
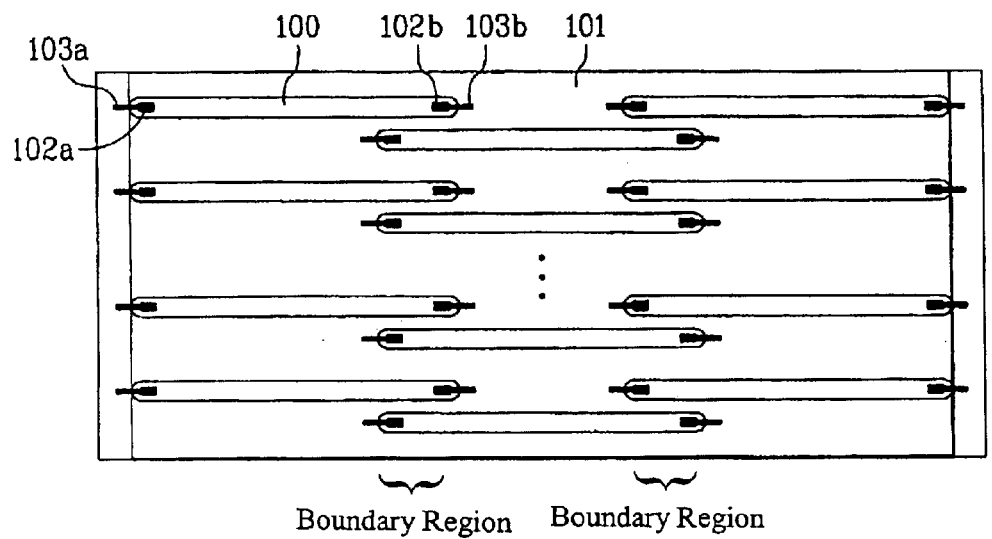
FIG. 10 illustrates a plan view of a second exemplary lamp arrangement for applying the present invention thereto.

A fifth exemplary embodiment for a back light unit of the present invention will be described with reference to FIGS. 5 and 10. FIG. 10 illustrates a plan view of a second exemplary lamp arrangement for applying the present invention thereto, and FIG. 11 illustrates a back view of a back light unit in accordance with a fifth exemplary embodiment of the present invention applied to the arrangement of FIG. 10.

The fifth exemplary embodiment for a back light unit of the present invention has lamps arranged, not in left and right parts in two stages alternately, but in multiple stages alternately. That is, not the entire light emission surface is divided into two parts and the lamps are arranged in the left and right parts alternately, but a length of the light emission surface is equally divided by an integer n and the lamps are alternate arranged in the equally divided parts alternately. A case in which the entire light emission surface is divided into three parts will be described as an example.

Figure 11:
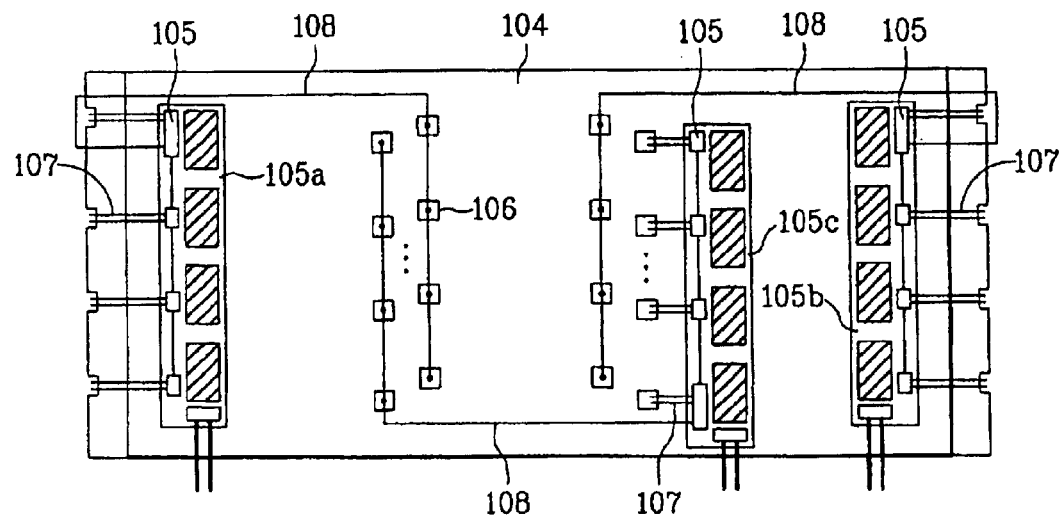
FIG. 11 illustrates a back view of a back light unit in accordance with a fifth exemplary embodiment of the present invention applied to FIG. 10.

Referring to FIGS. 10 and 11, the back light unit includes a plurality of lamps 100, each having electrode parts 102a and 102b in an inside of opposite ends of a tube, arranged in a left portion, a central portion and a right portion of an entire light emission surface of the back light unit as left, central, and right sets of lamps (i.e., left, central, and right lamps) which divide the entire light emission surface into three substantially, an outside case 104 for holding the lamps 100, a reflection plate 101 for directing a light emitted from the lamps 100 on an inside of the outside case 104 to a display part of the LCD panel, and light scattering means (not shown) between the lamps 100 and the LCD panel (not shown).

As the display screen of the LCD panel becomes longer, the longer the light emission surface of the back light unit also becomes longer as well as the length of the lamps as described before. However, longer lamps 100 requires a higher tube voltage to be applied to the lamp 100. To overcome this problem, lamps 100 each having a length approximately ⅓ of the length of the light emission surface of the lamp 100 are provided, and arranged in the left, central, and right portions of the light emission surface.

Referring to FIG. 10, the lamps 100 may be arranged such that tubes except the electrode parts 102a and 102b are arranged on lines equally dividing the light emission surface into three overlapped to define a staggered or zigzag form. Though not shown on the drawing, the electrode parts 102a and 102b are substantially on the equally dividing lines. The short length of the lamp 100 permits a reduction in the sustaining voltage (a tube voltage) of the lamp and to improve luminance uniformity of the entire screen. The lamp 100 is a CCFL having electrode parts 102a and 102b on opposite ends of an inside of the tube to which power lines 103a and 103b are connected. When voltages are applied to the electrode parts 102a and 102b through the power lines 103a and 103b, the lamp 100 emits a light. The voltages to the power lines 103a and 103b are provided from three inverters; first, and second inverters 105a and 105b are arranged on a back surfaces of opposite edges of the outside case 104, and a third inverter 105c are arranged adjacent to one of the first and second inverters 105a and 105b. An example in which the third inverter 105c is arranged adjacent to the second inverter 105b will be explained.

There are a plurality of power line holes 106 in the reflection plate 101 and an inside of the outside case 104 facing ends of the lamps 100. Of the power lines 103a and 103b to the lamps 100 positioned at opposite edges of the outside case 104 and the power lines 103a and 103b arranged in the central portion, the power lines 103a and 103b adjacent to the third inverter 105c are used as high voltage power lines 107. That is, the high voltage power lines 107 are power lines 103a, 103b arranged in portions opposite to the first, second, and third inverters 105a, 105b and 105c. The high voltage power lines 107 are connected to one terminals of the connectors 105 of the first, second and third inverters 105a, 105b and 105c. Of the power lines 103a and 103b at opposite ends of the lamps 100, the power lines 103a and 103b far from the first to third inverters 105a, 105b, and 105c are used as low voltage power lines, and passed through the power line holes 106 and connected to the low voltage common power line 108 in common. The low voltage common power line 108 is a single line, and has one end connected to one of the connectors 105 of the first to third inverters 105a, 105b and 105c.

Though not shown, the low voltage common power line 108 may be connected as one single line by arranging PCB substrates in a height direction along which the power line holes 106 are formed, and soldering the power lines 103a and 103b passed through the PCB substrates to electrode lead lines formed on one line on the PCB substrates. The electrode lead lines are connected to the low voltage common power line 108 connected to the connectors of the first to third inverters 105a, 105b and 105c. Instead of the PCB substrates, electric wires may be used for connecting the low voltage power lines to the low voltage common power line 108.

In connecting the high voltage power lines 107 and the low voltage common power line 108 to the connectors of the first to third inverters, lengths of the high voltage power lines 107 are provided to be equal to or shorter than lengths of the low voltage power lines 108, thereby minimizing electronic influence on the LCD panel.

In more detail, since the first and second inverters 105a and 105b are arranged on opposite edges of the back surface of the outside case 104, and the third inverter 105c is arranged adjacent to the second inverter 105b, the power lines 103a and 103b of the lamps 100 at the opposite edges and the power lines 103a and 103b adjacent to the third inverter 105c are passed through the power line holes 106, and used as high voltage power lines 107. Of the power lines 103a and 103b of the lamps 100 positioned in an inside of the outside case 104, the power lines 103a and 103b except the power lines 103a and 103b adjacent to the third inverter 105c are passed through the power line holes 106 and connected to the low voltage common power line 108.

Though not shown in the drawings, if the length of the light emission surface is divided by 'n' equally, the inverters will be arranged on the back surface of the outside case, and the plurality of power lines connect the power lines at ends of the lamps arranged in a portion opposite to the inverter to one terminals of the inverter connectors. The plurality of low voltage power lines connect the power line holes at the other ends of the lamps passed through the power line holes to the other ends of the inverter connectors.

Figure 12:
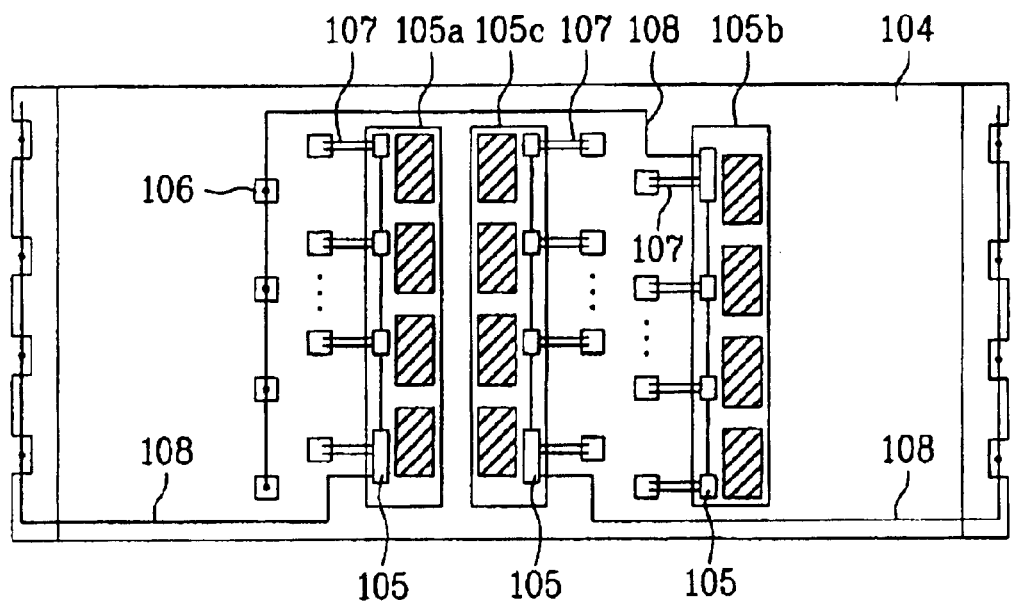
FIGS. 12 and 13 illustrate alternative configurations in a back view of a back light in an arrangement where the lamps divide the emission surface into three portions.
Figure 13:
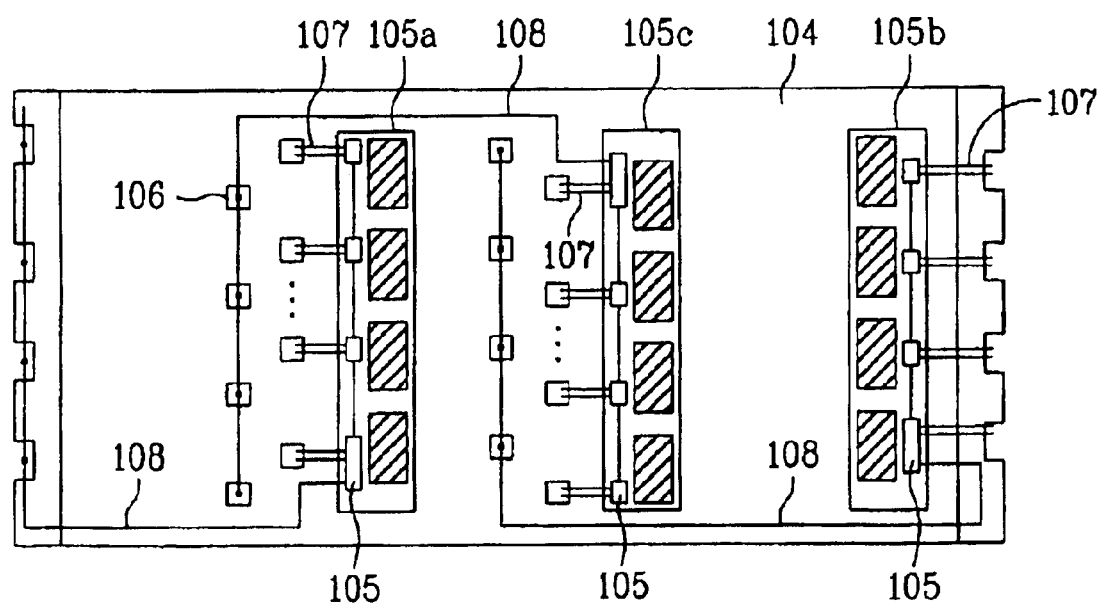
Figure 14:
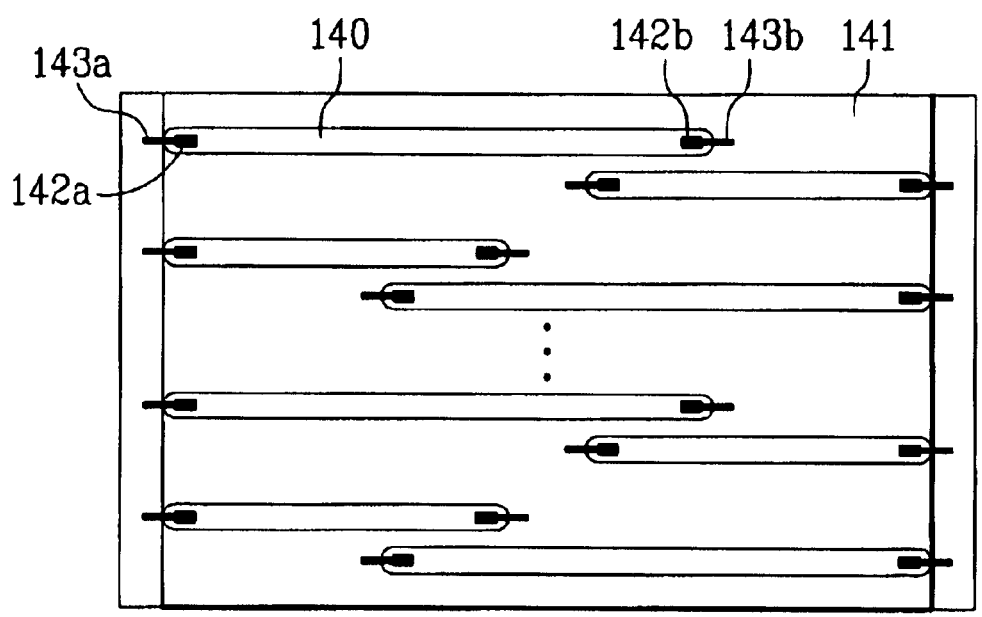
FIG. 14 illustrates a plan view of another exemplary lamp arrangement having unequal lengths.

Of course, a number of variations of the above-described exemplary embodiments can be recognized and utilized in accordance with the present invention. For example, other arrangements of converters and power line holes can be envisioned in accordance with the present invention. For instance, in a case where the emission surface is divided into three portions, the inverters and power line holes can alternatively be arranged as shown in FIG. 12, FIG. 13, or any other arrangement. In addition, while the foregoing exemplary embodiments have been described with the lamps substantially equally dividing the emission surface, the lamp may be used in an unequal configuration as shown in FIG. 14. Here, because the overlaps are spread about the emission surface, an bright areas (or dark areas) resulting from the overlapped (nonoverlapped portions) can be reduced. Also, features of the different exemplary embodiments and/or lamp arrangements can be combined in accordance with the present invention.

The back light unit of the present invention has a number of advantages. For example, an arrangement of lines to the plurality of lamps can be simplified, and consequently, electrical characteristic can be stabilized. In addition, the use of short lamps in fabrication of a large sized display permits wider use of a given lamp size regardless of the size of the display. Moreover, the use of short lamps permits to moderate operation conditions (starting voltage and operation voltage) of the lamps, thereby reducing deterioration of picture quality (EMI) caused by an electrical influence to the driving circuit of the LCD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A back light unit having a light emission surface, comprising:
    a plurality of lamps each having first and second ends, each lamp disposed substantially only in one of an inter (n) number regions of the light emission surface, wherein the regions divide a length of the light emissions surface into n regions;
    a case for holding the lamps;
    a reflection plate disposed on an inside surface of the case;
    a plurality of inverters on a back side of the case;
    a plurality of power line vias formed through portions of the case and the reflection plate at portions adjacent to the second ends of the lamps, the lamps being disposed of an inside of the case;
    a plurality of the first power lines respectively connected between the first ends of the lamps and first connectors of the inverters; and
    at least one second power line connected between the second ends of the lamps and second connectors of the inverters, the at least one second power line passing through the power line vias.

2. The back light unit according to claim 1, wherein the lamps have a length substantially 1/n of the length of the emission surface.

3. The back light unit according to claim 1, wherein the first power lines are high low voltage power line.

4. The back light unit according to claim 1, wherein the at least one second power line includes at least one low voltage power line.

5. The back light unit according to claim 1, wherein the case includes a PCB substrate and the second power line is connected to electrodes of the second ends of the lamps through the PCB substrate.

6. The back light unit according to claim 5, wherein the at least one second power line is connected to electrodes of the second ends of the lamps through the PCB substrate by soldering.

7. A back light unit having a light emission surface, comprising:
    a plurality of lamps such that a first set of the lamps is disposed in a left portion of the light emission surface and a second set of the lamps is disposed in a right portion of the light emission surface, the left and right portions to divide a length of the emission surface;
    a case for holding the lamps on an inside thereof;
    a reflection plate disposed on an inside surface of the case;
    a plurality of inverters such that first and second ones of the inverters are on opposing edges of a back surface of the case;
    a plurality of power line vias formed through the case and the reflection plate at portions adjacent to ends of the lamps in a central portion of the case;
    a plurality of high voltage power lines respectively connected between ones of the inverters and ends of the lamps disposed on a side of the case opposite to the inverters; and
    at least one low voltage power line connected between at least one of the inverters and ends of the lamps proximate to the power line vias through the power line vias.

8. The back light unit according to claim 7, wherein the at least one low voltage power line includes at least one low voltage common power line such that the at least one low voltage common power line is connected to the lamps through the power line vias.

9. The back light unit according to claim 8, wherein the at least one low voltage common power line is connected to one of connectors of the inverters.

10. The back light unit according to claim 9, wherein the at least one low voltage power line includes a plurality of low voltage common power lines such that each low voltage power line is connected between a respective one of the inverters and a respective one of the lamps through a respective one of the power line vias.

11. The back light unit according to claim 7, wherein each of the lamps includes first and second electrodes, and the first electrodes of the lamps of the right set and the second electrodes of the lamps of the left set are disposed to form a zigzag pattern.

12. The back light unit according to claim 11, wherein the zigzag pattern of first and second electrodes substantially defines a boundary between right and left portions of the light emission surface with the right and left portions being substantially equal in area.

13. The back light unit according to claim 7, wherein each lamp is a Cold Cathode Fluorescent Lamp (CCFL) having electrodes at the ends of the lamp, the electrodes respectively connected to a corresponding one of the plurality of high voltage power lines and a corresponding one of the at least one low voltage power line.

14. The back light unit according to claim 7, wherein each one of the high voltage power lines has a length equal to or shorter than each one of the at least one low voltage power line.

15. A back light unit having a light emission surface, comprising:
    a plurality of lamps such that a first set of the lamps are disposed in a left portion of the light emission surface and a second set of the lamps are disposed in a right portion of the light emission surface, the left and right portions substantially equally divide a length of the emission surface;
    a case for holding the lamps on an inside thereof;
    a reflection plate disposed on an inside surface of the case;

a plurality of inverters such that first and second ones of the inverters are disposed at a central portion of the case on a back side of the case;

a plurality of power line vias formed through the case and the reflection plate at portions adjacent to ends of the lamps in the central portion of the case;

a plurality of high voltage power lines respectively connected between the inverters and ends of the lamps disposed on a side of the case opposite to the inverters through the power line vias; and at least one low voltage power line respectively connected between at least one inverter and the other ends of the lamps.

16. The back light unit according to claim 15, wherein the lamps are Cold Cathode Fluorescent Lamps (CCFLs) having electrodes at the ends of the lamp, the electrodes of each lamp respectively connected to one of the high voltage power lines and one of the low voltage power lines.

17. The back light unit according to claim 15, wherein each one of the high voltage power lines has a length equal to or shorter than each one of the low voltage power lines.

18. A back light unit for providing light to a light emission surface, comprising:

a plurality of lamps each having first and second ends, each lamp disposed substantially only in one of an integer (n) number regions of the light emission surface, wherein the regions divide a length of the light emission surface into n regions;

a case for holding the lamps and having a reflection plate disposed on a surface of the case to reflect light emitted from the lamps toward the light emission surface;

a power supply system;

a plurality of first power lines respectively connected through vias defined in the case and reflection plate to the first ends of the lamps and first connectors of the power supply system; and a plurality of second power lines respectively connected through vias defined in the case and reflection plate to the second ends of the lamps and second connectors of the power supply system.

19. The back light unit according to claim 18, wherein the power supply system includes:

a first inverter disposed at an edge portion of a back side of the case;

a second inverter disposed at a first central portion on the back side of the case; and a third inverter disposed at a second central portion.

20. The back light unit according to claim 18, wherein the power supply system includes:

first and second inverters disposed at opposite edge portions of a back side of the case; and a third inverter arranged on the back side of the case adjacent to one of the first and second inverters.

21. The back light unit according to claim 18, wherein the power supply system includes first, second and third inverters disposed at respective central portions on the back side of the case.

22. The back light unit according to claim 18, wherein each of the lamps includes first and second electrodes, wherein the first electrodes of lamps of one region of the light emission surface and the second electrodes of an adjacent region of the light emission surface define a boundary between the one region and the adjacent region.

23. A back light unit for providing light to a light emission surface, comprising:

a plurality of lamps each having first and second ends, the lamps being disposed so that sets of the lamps span a substantially entire length of the light emission surface, each set having more than one lamp;

a case for holding the lamps and having a reflection plate disposed on a surface of the case to reflect light emitted from the lamps toward the light emission surface;

a power supply system;

a plurality of first power lines respectively connected through vias defined in the case and reflection plate to the first ends of the lamps and first connectors of the power supply system; and a plurality of second power lines respectively connected through vias defined in the case and reflection plate to the second ends of the lamps and second connectors of the power supply system.

24. The back light unit according to claim 23, wherein the sets of lamps spanning the length of the light emission surface have substantially same lengths.

25. The back light unit according to claim 23, wherein the sets of lamps spanning the length of the light emission surface have unequal lengths.

26. A back light unit for providing light to a light emission surface, comprising:

a plurality of lamps each having first and second ends, each lamp disposed substantially only in one of an integer (n) number regions of the light emission surface, wherein the regions divide a length of the light emission surface into n regions;

a power supply system;

a plurality of first power lines respectively connected to the first ends of the lamps and first connectors of the power supply system; and a plurality of second power lines respectively connected to the second ends of the lamps and second connectors of the power supply system, wherein the power supply system includes:

a first inverter disposed at an edge portion of a back side of the case;

a second inverter disposed at a first central portion on the back side of the case; and a third inverter disposed at a second central portion.

27. A back light unit for providing light to a light emission surface, comprising: a plurality of lamps each having first and second ends, each lamp disposed substantially only in one of an integer (n) number regions of the light emission surface, wherein the regions divide a length of the light emission surface into n regions;

a power supply system;

a plurality of first power lines respectively connected to the first ends of the lamps and first connectors of the power supply system; and a plurality of second power lines respectively connected to the second ends of the lamps and second connectors of the power supply system, wherein the power supply system includes:

first and second inverters disposed at opposite edge portions of a back side of the case; and a third inverter arranged on the back side of the case adjacent to one of the first and second inverters.

28. A back light unit for providing light to a light emission surface, comprising:

a plurality of lamps each having first and second ends, each lamp disposed substantially only in one of an integer (n) number regions of the light emission surface, wherein the regions divide a length of the light emission surface into n regions;

a power supply system;

a plurality of first power lines respectively connected to the first ends of the lamps and first connectors of the supply system; and a plurality of the second power lines respectively connected to the second ends of the lamps and second connectors of the power supply system, wherein the power supply system includes first, second and third inverters disposed at respective central portions on the back side of the case.

* * * * *